May 20, 1952 — O. MONTABONE — 2,597,512
DEVICE FOR CIRCULATING COOLING WATER
IN INTERNAL-COMBUSTION ENGINES
Filed June 27, 1950

Inventor
Oscar Montabone
By Robert E. Burns
Attorney

Patented May 20, 1952

2,597,512

UNITED STATES PATENT OFFICE 2,597,512

DEVICE FOR CIRCULATING COOLING WATER IN INTERNAL-COMBUSTION ENGINES

Oscar Montabone, Turin, Italy, assignor to Fiat S. p. A., Turin, Italy

Application June 27, 1950, Serial No. 170,517
In Italy June 30, 1949

2 Claims. (Cl. 123—41.28)

This invention relates to devices for circulating cooling water in internal combustion engines, more particularly for motor vehicles.

Ordinary water circulating devices generally comprise a water distributor consisting of a tubular member longitudinally arranged within the cylinder heads, the water being circulated about the cylinder liners by thermosiphonage.

The characteristic feature of this invention resides in the fact that the tube arranged in the cylinder heads is utilised for controlling circulation also in the crank case portion of the engine.

According to this invention lower holes are bored in the distributor for the outlet of water which flows through small tubes arranged in the cylinder heads to the lower engine portion.

The water flows along the liners and back to the upper head portion through a further set of conduits.

The accompanying drawing shows a construction according to this invention.

Figure 1:
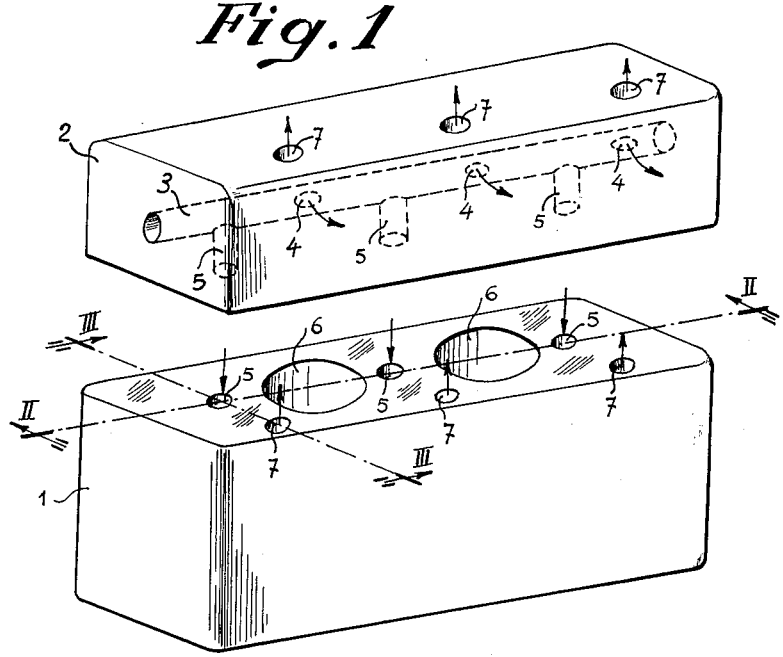
Figure 1 is a diagrammatic perspective view of the cylinder block and head separate from each other.
Figure 2:
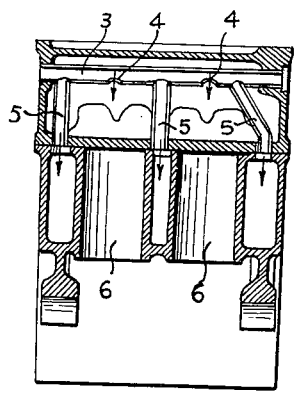
Figure 2 is a longitudinal section of an embodiment of the engine according to this invention.
Figure 3:
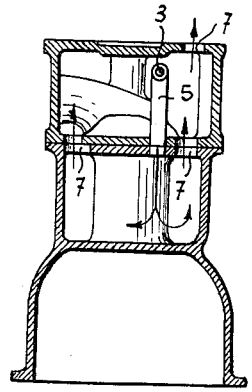
Figure 3 is a cross section thereof.

Referring to the drawing 1 denotes the crank case of an internal combustion engine, of which 2 denotes the head.

3 denotes the conventional tube longitudinally arranged in the head and serving for the delivery of water for cooling the head through holes 4.

According to this invention holes are bored in the lower tube portion and communicate with small tubes 5 extending vertically to the lower portion of the crank case 1.

After flowing along the cylinder liners 6 water is returned to the upper portion of the head 2 through a further set of conduits 7.

What I claim is:

1. In an internal combustion engine, a device for circulating cooling water comprising a delivery tube extending longitudinally in the cylinder head and having holes for delivering water into the head, branch pipes extending from said tube, vertical tubes in the crank case communicating with said branch pipes for controlling the water circulation therein and conduits in the crank case for returning the cooling water to the upper head portion.

2. In an internal combustion engine a device for circulating cooling water, comprising a delivery conduit arranged in the top portion of the engine head and provided with means for supplying cooling water simultaneously and separately to the engine head and body, means for bringing together said separate streams in said head on the return movement and openings in said head for discharging the water heated by the engine.

OSCAR MONTABONE.

REFERENCES CITED

The following references are of record in the file of this patent:

UNITED STATES PATENTS

| Number | Name | Date |
|---|---|---|
| 1,330,436 | Fekete | Feb. 10, 1920 |
| 1,372,897 | Nelson | Mar. 29, 1921 |
| 1,510,766 | Clark | Oct. 7, 1924 |
| 1,861,106 | Barkeij | May 31, 1932 |
| 1,958,156 | Whelan | May 8, 1934 |